United States Patent [19]

Bundus

[11] 4,307,123

[45] Dec. 22, 1981

[54] FROZEN DESSERT COMPOSITION

[75] Inventor: Robert H. Bundus, Rochester, Mich.

[73] Assignee: Stauffer Chemical Company, Westport, Conn.

[21] Appl. No.: 221,175

[22] Filed: Dec. 29, 1980

Related U.S. Application Data

[63] Continuation of Ser. No. 61,326, Jul. 27, 1979, abandoned.

[51] Int. Cl.$^3$ .............................................. A23G 9/02
[52] U.S. Cl. ................................... 426/565; 426/654; 426/566
[58] Field of Search ............... 426/565, 566, 567, 579, 426/654

[56] References Cited

U.S. PATENT DOCUMENTS

| | | | |
|---|---|---|---|
| 2,633,424 | 3/1953 | Otting et al. | 426/565 |
| 3,291,614 | 12/1966 | Timerman | 426/565 |
| 3,434,848 | 3/1969 | Katz | 426/565 |
| 3,702,768 | 11/1972 | Finucane et al. | 426/566 |
| 3,949,102 | 4/1976 | Hellyer et al. | 426/566 |

*Primary Examiner*—Jeanette M. Hunter
*Attorney, Agent, or Firm*—Paul J. Juettner

[57] ABSTRACT

A single package dry freezer dessert mix preparable with water is provided having the composition of 1.5–20% protein, 4% to 20% lipid material, stearoyl-2-lactylic acid or the alkali or alkaline earth metal salts thereof and optionally, a stabilizer to prevent ice crystal formation and an emulsifier. The single package dry system can be used to prepare frozen desserts by diluting with water or optionally milk, whipping and freezing.

21 Claims, No Drawings

FROZEN DESSERT COMPOSITION

This is a continuation of application Ser. No. 061,326 filed July 27, 1979 now abandoned.

BACKGROUND OF THE INVENTION

1. Field of the Invention

The present invention relates to an improved dry composition for preparing frozen desserts.

2. Description of the Prior Art

There are various desserts enjoyed by the public including cakes, puddings, custards, and frozen confections such as ice cream. The consumer has been provided with mixes to easily prepare most of these desserts. Until recently, there were few if any mixes for home use in the area of frozen confections.

Presently, there is being marketed a mix for preparing freezer desserts which requires the blending of a packet of dry powder with a packet of a highly viscous liquid and milk. The mixture is whipped with a hand-mixer until a large amount of air has been incorporated. The increase in volume due to the incorporation of air is called "overrun". Generally, the overrun on this product is about 100%. The mixture can be added as is to pie crusts or blended with fruit or combined with cake to make a variety of frozen desserts. The product is composed of (in decreasing order of concentration):

Nonfat milk
partially hydrogenated vegetable oil (soybean and coconut)
Corn syrup solids
Corn syrup
Sugar
Water
Invert sugar syrup
Propylene glycol esters
Polyglycerol esters
Karaya gum
Sodium hexametaphosphate
Citric acid
Potassium sorbate
Artificial flavors
Vitamin A palmitate
Artificial color The consumer in order to prepare this product must blend the dry mix with the highly viscous fluid which has the consistency of honey. It is necessary to squeeze the viscous fluid from the package which makes for added difficulty in preparing the final frozen composition.

Further, the prior art composition requires the use of liquid milk in its preparation. Since there are occasions when liquid milk is unavailable, this limitation adds a further undesirable aspect to this product.

It would be desirable to provide a frozen dessert mix which does not require two packages nor the addition of liquid or fluid milk.

BRIEF DESCRIPTION OF THE INVENTION

In accordance with the present invention, it has been found that a single package dry freezer dessert mix which can use water or, optionally, fluid milk for dilution can be provided having a composition comprising:
(1) a protein source sufficient to provide from about 1.5% to about 20% protein;
(2) from about 4% to about 20% of a lipid material;
(3) optionally, an effective amount of a stabilizer sufficient to prevent the formation of ice crystals.
(4) an effective amount of a sweetener sufficient to adjust the sweetness of the composition to the level desired; and
(5) from about 0.15% to about 2.0% of stearoyl-2-lactylic acid or the alkali and alkaline earth metal salts thereof.

the percentages being based on the total weight of the dry composition. The composition of the present invention can be diluted to a total solids content of from about 30% to about 60% with water or if desired, fluid fatted or skim milk, fruit juice or mixtures thereof. Upon whipping to an overrun of 75% or more, the whipped composition can be frozen alone or in crusts or forms to prepare frozen desserts of the nature of ice cream.

DETAILED DESCRIPTION OF THE INVENTION

The protein source can be any source, animal or vegetable, which can provide a water soluble or partially water soluble protein which can assist in forming a stable emulsion with the other ingredients of the composition. If taste is an important factor, a bland protein system can be used.

The protein systems which are particularly useful in the present invention are dairy derived protein sources in dry form such as dry whole milk, dry defatted milk, dry skim milk (non-fat dry milk—NFDM), partially delactosed dry skim milk, sodium or calcium caseinate, whey solids, whey protein concentrate, modified whey solids, fermented dairy solids such as dry yogurt solids and protein fortified yogurt solids such as whey protein concentrate fortified yogurt solids. The preferred materials are NFDM, partially delactosed skim milk solids, and yogurt solids. Yogurt solids are prepared by fermenting an appropriate base such as milk and/or whey with yogurt producing bacteria such as *L. bulgaricus* and *S. thermophilus*. Milk protein such as NFDM, Na, or Ca caseinate, acid stable caseinate, whey solids, concentrated whey protein, and the like as well as other additives including hydrolyzed cereal solids such as corn syrup solids, sugars, agents for promoting culture growth can be added before, during or after culturing as is appropriate. Yogurt solids includes those products fermented by the normal yogurt bacteria but the final product does not necessarily contain live active culture.

The protein is used in an amount sufficient when combined with the other ingredients of the composition to provide a stable emulsion. The amount of protein used depends on the source and quality of the protein as well as the type of final product desired. For instance, a product can be prepared with 2.3% sodium caseinate or about 2.1% protein though taste may be less than acceptable. An ice cream type composition prepared with, for example, partially delactosed skim milk solids (53% protein) requires approximately 25% protein source or 13.25% protein. In general, the protein source is used in an amount sufficient to provide from about 1.5% to about 20% and preferably from about 10% to about 15% protein in an amount sufficient to provide a stable emulsion.

Stearoyl-2 lactylic acid or lactylate salt thereof can be described as the stearic acid ester with lactate of lactic acid.

Since the compositions of the present invention are food products, only edible grade materials are suggested for use. The most preferred compound is stearoyl-2-lactylic acid. The preferred metal ions are sodium, potassium and calcium. The preferred lactylic compounds are stearoyl-2-lactylic acid, sodium stearoyl-2-lactylate, potassium stearoyl-2-lactylate and calcium stearoyl-2-lactylate. As used herein, the term "lactylic compound" is intended to encompass formula including the lactylic acid and salts thereof.

The lipid used in the present invention can be any lipid which is admixable with the other dry ingredients and which can under the conditions of the preparation of the final product form an emulsion. Oils and partially hydrogenated oils of animal or vegetable source and the like which are fluid at temperatures above 18° C. are preferred for ease of incorporation of the lactylic compound and for ease of reconstitution. For example, partially hydrogenated soy bean oil is fluidized at about 65° C. and blended with the lactylic compound and an emulsifier to facilitate the functioning of the lactylic compound as a whipping aid. Other lipid materials such as flake or dry shortening, animal fat, solidified shortening and the like can also be used. However, these are less preferred since these hard fats must be melted and emulsified in order to allow the final product to whip. If the fat is of a high melting point, it may require emulsification at elevated temperature so that the fat can be emulsified prior to solidifying. A suggested procedure for preparing the final composition would involve dissolving the ingredients in a portion of the water or milk which is heated to a temperature sufficient to melt the fat, whipping the liquid to emulsify the fat followed by adding in the remainder of liquid at a cold temperature. This two step process for the preparation of the final product is not desirable for home use but would find use in commercial applications. Any procedure which will effectively allow the lipid material to be emulsified at the time of whipping can be utilized.

The lipid material can be used in an amount ranging from about 4% to about 20%, by weight, of the dry composition. The amount of lipid utilized is that amount needed to act as the carrier for the lactylic compound and provide a high overrun and a smooth tasting product. In the preferred embodiment, the lipid material is a partially hydrogenated vegetable oil which can be used in an amount ranging from about 8% to about 18%. The actual percentages needed for an effective product may vary but are easily determined by one skilled in the art.

The sweetener used in the present invention can be any edible dry natural or synthetic sweetener. This includes the sugars such as sucrose, fructose, and dextrose, corn syrup solids (D.E. 5–50), and the like. The amount of sweetener utilized is sufficient to adjust the sweetness to the level desired. The sweetener also acts as a suitable vehicle for the oil mix and is used in an amount sufficient to achieve that end. It is preferred to utilize mixtures of sucrose and corn syrup solids to adjust not only the sweetness level but also the solubility and flowability characteristics of the dry mix. Sugars such as lactose if finely ground (<200 mesh) can be used. However, since the sweetening capacity of lactose is extremely low, the use of lactose at a high solids level is not desirable. Lactose can be used as a carrier for synthetic sweeteners such as saccharine.

The composition of the present invention also includes from about 0% and preferably from about 0.15% to about 5.0% of a food grade emulsifier other than the lactylic compound. This emulsifier assists in emulsifying the lipid material/lactylic compound blend to make the same water dispersible. The emulsifier is preferably added as part of the lipid material in a preblend mixture of lipid and lactylic compound. Exemplary of such emulsifiers are food grade emulsifiers such as mono- and diglycerides, propylene glycol fatty acid esters, sorbitan monostearate, polyoxyethylene sorbitan fatty acids, and the like and mixtures thereof. The preferred emulsifiers are propylene glycol fatty acid esters having a carbon chain length of from about 16 to about 18. Mixtures of emulsifiers are also effective. Illustrative of such mixtures is the combination of propylene glycol fatty acid esters with mono and diglycerides. These emulsifiers in general are available in various forms such as liquid, viscous liquid, powder, flake, granule, bead, solid and paste though any particular one might not be available in all forms.

While the previously listed emulsifiers are preferred, a wide range of food grade emulsifiers can be used such as those listed under "Emulsifier: Whipping and Foaming Agents" on page 1013, of a book entitled: *FOODS, CHEMICALS CODEX*, 2nd Edition, published by the National Academy of Science, Washington, D.C., 1972 and the supplements thereto. That list of emulsifiers including those listed in the supplements is incorporated herein by reference.

Preferably, the emulsifier is a stearic/palmatic-monoester of propylene glycol.

The composition of the present invention also preferably includes a stabilizer to prevent formation of ice crystals. These stabilizers are well known in the art and primarily include cold water soluble hydrocolloid gums such as karaya, xanthan, carrageenan, alginate, cellulose derivatives such as carboxymethyl cellulose (CMC) and hydroxy propyl cellulose, locust bean gum, and mixtures thereof. The preferred gums are karaya and xanthan and most preferably xanthan. Other stabilizer systems can also be used if desired. The amount of stabilizer used is that amount sufficient to prevent ice crystal growth without substantially affecting the taste and mouth feel of the final composition. Since some stabilizers are more effective than others, the amount used can vary widely. Exact amounts can be easily determined by one skilled in the art.

The compositions of the present invention are prepared such that at the time of whipping the lactylic compound is thoroughly dispersed throughout the final composition in a water soluble form. The lactylic compound has the appearance of hard fat which liquifies at about a temperature ranging from about 40° C. to about 50° C. In one form of the invention, the lipid material is heated with the lactylic compound until both are fluid. An emulsifier is blended with the liquid lipid material and and the lactylic compound until a stable liquid blend is formed. In this instance, the lipid material acts as a carrier for the lactylic compound. Subsequent to cooling of the blend, the blend is admixed with a preformed admixture of the remaining dry ingredients. The mixture is sufficiently blended to form a substantially uniform blend.

Any method of blending can be utilized which accomplished the end of uniformly dispersing the lactylic compound in a water soluble, functional fat form without denaturing or causing precipitation of the other ingredients in the composition. For instance, lactylic compound could be added to the overall composition which could then be heated by the consumer. It is preferred for convenience and product quality control to emulsify the lactylic compound and oil prior to blending with the dry ingredients.

For uniformity and functionality, it is preferred that the dry ingredients be premixed prior to admixing with the oil/lactylic compound blend.

The dry powder and the oil are preferably blended under agitation at room temperature though temperatures as high as 49° C. can be used if desired.

It is also contemplated to prepare the compositions of the present invention by admixing all ingredients in a liquid state for uniform blending followed by drying of the whole composition. In this manner, liquid milk could be used if desired. This method is less preferred because of the costs involved in drying.

The compositions of the present invention can be flavored and colored as desired. The flavoring and coloring can be natural or artificial and can be added by the manufacturer or the consumer as desired. The term "flavoring" also includes preserves, fruit pieces, spices, candy particles, nuts and the like.

Other materials which can be added if desired to the compositions of the present invention include sodium hexametaphosphate, citric acid, preservatives such as potassium sorbate and the like, food fortifiers other than protein such as vitamins and minerals as well as other additives normally used with frozen desserts.

The frozen desserts of the present invention are prepared by blending the dry solids composition and a fluid with agitation. It is preferred that the ratio of fluid to total solids provide a final composition having from about 30% to about 60% total solids and preverably from about 42% to 52% solids. While the fluid portion can be water, a richer product is obtained by blending the dry powder with skim milk as a total or partialy substitute for the water.

An even richer product is obtained using whole milk alone or in combination with water and/or skim milk. The amount of solids contributed by the skim milk or the whole milk does not contribute to the total solids limitation given above. In essence, the water is replaced volume for volume with the skim and/or whole milk.

The fluid can be added incrementally or totally as desired though incrementally is preferred to improve dispersion. It is suggested that a small quantity of water such as ⅛, be added to the powder and mixed thoroughly before adding the remainder. The composition upon complete addition of the fluid is whipped until a sufficient amount of air has been incorporated to provide a desirable overrun. Overruns of about 75% and preferably above 95% are preferred. For a convenient commercial product, the overrun level should be acomplished in a reasonable time. A standard chosen for the preferred compositions of the present invention is a 100% overrun in about three minutes though more or less time can be used depending on the system.

If it is desired to obtain a fruit flavored product, the juice from mashed fruit can be used as a portion of the fluid. The fruit juice can comprise all or part of the fluid. Acidic juices which may curdle milk protein should be used with skim milk or in whole milk products under cold conditions of mixing. Mashed and fruit puree or nuts can also be blended in the final composition preferably after whipping.

The frozen compositions of the present invention can be scooped and served like ice cream, frozen into forms such as specialty cakes, pie crusts, i.e., graham cracker crusts, layer cakes with crushed cookie crusts, cake interlayers or tops, used as a frozen layer for a layer cake, rolled into a roll or ice cream type cake roll. Appropriate toppings can be used if desired. The compositions of the present invention can also be frozen into individual portions with an integral stick and covered with such toppings as chocolate, scooped into ice cream cones, or served from an instance freezing machine typically known as a soft serve ice cream machine in a cone, dish or as part of a sundae or soda.

The compositions of the present invention can also be used unfrozen as whipped toppings or the like if desired.

The present invention will be further illustrated in the Examples which follow.

Example 1

12.27 parts of partially hydrogenated soy bean oil, 2.30 parts of P-06 (a propylene glycol ester emulsifier sold by Eastman Kodak Company) and 0.6 parts of stearoyl-2-lactylic acid were heated to a temperature of about 65° C. until a uniform blend is obtained. After cooling the oil blend to about 21° C., the blend is admixed with a dry powder blend comprising:

| Parts by Weight | Ingredients |
| --- | --- |
| 25 | Dried partially delactosed skim milk |
| 29.55 | Corn syrup solids (24 D.E.) |
| 30. | Powdered sugar, and |
| 0.2 | Xanthan gum |
| 0.22 | Imitation vanilla flavor |

The mixture is agitated until a homogeneous blend is obtained.

43.2 parts of the mixture is blended with 56.8 parts water (41.9% total solids). This blend is agitated with a home-type mixer for about three minutes. Overrun is approximately 100%. Upon freezing this mixture for eight hours at −17° C., a good tasting product resembling commercial ice cream is obtained having a clean mouth feel.

The composition of Example 1 can be flavored with known artificial and natural flavors such as cocoa, vanilla, raspberry, pineapple, peppermint, and the like.

EXAMPLE 2

Example 1 is repeated using the following formulation:

| Parts by Weight | Ingredients |
| --- | --- |
| 12.3 | Partially hydrogenated soy bean oil |
| 2.4 | Emulsifier (P-06) |
| 0.6 | Stearoyl-2-lactylic acid |
| 25. | Dried partially delactosed skim milk |
| 29.0 | Corn syrup solids (24 D.E.) |
| 30.4 | Powdered sugar, and |
| 0.2 | Xanthan gum |

44 parts of this mixture is blended with 56 parts water. Overrun upon whipping for three minutes is about 100%. Upon freezing, a good tasting product is obtained.

EXAMPLE 3

The procedure of Example 1 is repeated using the following formulation in parts by weight:

| Parts by Weight | Ingredients |
| --- | --- |
| 10.3 | Partially hydrogenated soy bean oil |

| Parts by Weight | Ingredients |
|---|---|
| 3.07 | Emulsifier (P-06) |
| 1.0 | Sodium stearoyl-2-lactylate |
| 45.4 | Dried partially delactosed skim milk |
| 38.4 | Powdered sugar |
| 1.15 | Karaya gum |
| 0.23 | Sodium hexametaphosphate |
| 0.20 | Citric acid |

The above formulation when mixed with 50 parts with 50 parts water whips to 100% overrun in less than three minutes. A very good product is obtained after freezing.

EXAMPLE 4

The procedure of Example 1 is repeated using the following formulation in parts by weight:

| Initial | Final | Ingredients |
|---|---|---|
| 6.00 | 2.64 | Partially hydrogenated soy bean oil |
| 2.38 | 1.05 | Emulsifier (P-06) |
| .60 | .26 | Stearoyl-2-lactylic acid |
| 26.00 | 11.44 | Dried partially delactosed skim milk |
| 19.37 | 8.52 | Corn syrup solids (24 D.E.) |
| 45.45 | 20.00 | Powdered sugar |
| .20 | 0.09 | Xanthan gum |
|  | 56 | Water |

The powder and oils blend easily. Product is more like a powder and does not have a tendency to cake. Upon freezing, a smooth product similar to premium ice cream is obtained.

EXAMPLE 5

A dry powder is prepared as in the preceding examples using the following formulation:

| Parts by Weight | Ingredients |
|---|---|
| 15.35 | Partially hydrogenated soy bean oil |
| 3.0 | Emulsifier (P-06) |
| .8 | Sodium stearoyl-2-lactylate |
| 40.0 | Non-fat dried milk |
| 39.55 | Powdered sugar |
| 1.15 | Karaya gum |
| .2 | Flavor |
| .0038 | Color |

261 grams of the dry powder is diluted with 283 grams of water or 48% total solids. The product is not icy after slow freezing.

EXAMPLE 6

A frozen yogurt tasting dessert is prepared in accordance with the preceding examples using the following formulation:

| Parts by Weight | Ingredients |
|---|---|
| 13.4 | Partially hydrogenated soy bean oil |
| 2.6 | Emulsifier (P-06) |
| .7 | Stearoyl-2-lactylic acid |
| 19.4 | Dried yogurt solids with corn syrup solids added (CFS-FA available from Stauffer Chemical Company) |
| 43.6 | Powdered sugar |
| 19.53 | Corn syrup solids (10 D.E.) |
| .67 | Xanthan gum |
| .1 | Flavor |
| .002 | Color |

45 parts of the dry powder is mixed with 55 parts by weight water and whipped to 100% overrun in two minutes. Upon freezing, the product leaves a clean taste in the mouth, icy and very refreshing.

EXAMPLE 7

The preceding example is repeated using 20 parts yogurt solids with whey protein concentrate, NFDM, and sodium caseinate (CFS-AS available from Stauffer Chemical Company) and 20 parts corn syrup solids (10 D.E.). An excellent product which whips to 100% overrun in 2.5 minutes is obtained.

EXAMPLE 8

A frozen yogurt tasting dessert is prepared in accordance with the previous examples using the following formulation:

| Parts by Weight | Ingredients |
|---|---|
| 15.35 | Partially hydrogenated soy bean oil |
| 3.00 | Emulsifier (P-06) |
| .80 | Sodium stearoyl-2-lactylate |
| 25.00 | Partially delactosed skim milk solids |
| 39.55 | Powdered sugar |
| 15.0 | Corn syrup solids (10 D.E.) |
| 1.15 | Karaya gum |

When 40 parts of the dry powder is mixed with 60 parts by weight water, the product whips to 100% overrun in two minutes. A good product is obtained after freezing.

EXAMPLE 9

Alternative sources of fatty acids were compared to sodium stearoyl-2-lactylic acid. The following formulation was used:

| Parts by Weight | Ingredients |
|---|---|
| 15.35 | Partially hydrogenated soy bean oil |
| 3.0 | Emulsifier (P)06) |
| .8 | Fatty acid emulsifier |
| 40.0 | Milk solids non-fat |
| 39.55 | Powdered sugar |
| 1.15 | Karaya gum |
| .07 | Vanilla |

The emulsifiers tested are listed below with the amount of overrun achieved after whipping for three minutes:

|   |   | Overrun |
|---|---|---|
| (a) | Lactodan F-15, (lactic acid ester of monoglycerides sold by Grindsted Products)* | 55% |
| (b) | Cetodan 50-00V (acetylated monoglycerides sold by Grindsted Products)* | 73% |
| (c) | Cetodan 70-00V (acetylated monoglycerides sold by Grindsted Products)* | 53% |
| (d) | Myvatex 40-06S (Type "3-50" plus stearoyl lactic acid and water sold by Eastman Chemical Products)* | 70% |

| | | Overrun |
|---|---|---|
| (e) | Durkee 8-1-S (a stearoyl polyglyceride sold by Durkee Foods) | 73% |
| (f) | Stearoyl-2-lactylic acid control | 100% |

*See McCutcheon's Detergents and Emulsifiers, North American Edition, 1978 - The Manufacturing Confectioner Publishing Company.

The invention is further defined in the claims appended hereto.

What is claimed is:

1. A dry composition for preparing freezer desserts consisting essentially of a dry admixture of:
   (a) a protein source sufficient to provide from about 1.5% to about 20% protein, said protein being present in an amount sufficient when combined with the other ingredients of the composition to maintain a stable emulsion,
   (b) from about 4% to about 20% of a lipid material,
   (c) an effective amount of a sweetener sufficient to sweeten the composition, and
   (d) from about 0.15% to about 2.0% of stearoyl-2-lactylic acid or an alkali or alkaline earth metal salt thereof, the percentages being by weight based on the total dry weight of the composition.

2. The composition of claim 1 wherein said protein is a dairy-derived protein.

3. The composition of claim 1 wherein said protein source is milk solids.

4. The composition of claim 1 wherein said protein source is partially delactosed skim milk solids.

5. The composition of claim 1 wherein said protein source is yogurt solids.

6. The composition as recited in claim 5 wherein said yogurt solids further includes milk derived protein or hydrolyzed cereal solids.

7. The composition of claim 4 wherein said partially delactosed skim milk solids are present in an amount sufficient to provide from about 10% to about 15% protein.

8. The composition as recited in claim 1 wherein said lipid is selected from the group consisting of hydrogenated, partially hydrogenated and non-hydrogenated vegetable oils.

9. The composition as recited in claim 1 wherein the stearoyl-2-lactylic acid salt is selected from the group consisting of sodium stearoyl-2-lactylate, potassium stearoyl-2-lactylate, calcium stearoyl-2-lactylate and mixtures thereof.

10. The composition of claim 1 which further includes an effective amount of a stabilizer in an amount sufficient to substantially prevent formation of ice crystals.

11. The composition of claim 10 wherein said stabilizer is a vegetable gum selected from the group consisting of karaya, xanthan, and mixtures thereof.

12. The composition as recited in claim 11 wherein said gum is xanthan which is present in an amount ranging from about 0.1% to about 1.0%.

13. The composition as recited in claim 1 which further includes a food emulsifier other than said lactylic acid or salt thereof.

14. The composition as recited in claim 13 wherein said emulsifier is a propylene glycol fatty acid ester.

15. A dry composition for preparing frozen desserts comprising:
   (a) a protein source selected from the group consisting of dried whole milk, dried partially defatted milk, dried skim milk, dried partially delactosed milk, dried partially delactosed skim milk, yogurt solids, protein fortified yogurt solids, yogurt solids containing hydrolyzed cereal solids and mixtures thereof in an amount sufficient to provide from about 10% to about 15% protein,
   (b) from about 5.0% to about 18% of a lipid selected from the group consisting of hydrogenated, partially hydrogenated, or non-hydrogenated oil and mixtures thereof,
   (c) an effective amount of a sweetener sufficient to sweeten said composition;
   (d) an effective amount of a vegetable gum selected from the group consisting of karaya, xanthan, mixtures of karaya or xanthan and mixtures thereof,
   (e) from about 0.15% to about 2.0% of a member selected from the group consisting of stearoyl-2-lactylic acid, sodium stearoyl-2-lactylate, potassium stearoyl-2-lactylate, calcium stearoyl-2-lactylate and mixtures thereof; and
   (f) from about 0% to about 5.0% of a food grade emulsifier other than said member, the percentages being by weight based on the total dry weight of the composition.

16. The composition as recited in claim 15 wherein said protein source is selected from the group consisting of dried partially delactosed skim milk and yogurt solids.

17. The composition as recited in claim 15 wherein said sweetener is a blend of sucrose and corn syrup solids.

18. The composition as recited in claim 15 wherein said gum is xanthan.

19. The composition as recited in claim 15 wherein said member is stearoyl-2-lactylic acid.

20. The composition as recited in claim 15 wherein said emulsifier is present in an amount ranging from about 0.15% to about 2.0%.

21. The composition as recited in claim 15 wherein said emulsifier is a propylene glycol fatty acid monoester.

* * * * *

UNITED STATES PATENT AND TRADEMARK OFFICE
CERTIFICATE OF CORRECTION

PATENT NO. : 4,307,123
DATED : December 22, 1981
INVENTOR(S) : Robert H. Bundus

It is certified that error appears in the above-identified patent and that said Letters Patent are hereby corrected as shown below:

Col. 4, line 54 - delete second "and".

Col. 5, line 31 - change "preverably" to "preferably".

Col. 6, line 6 - change "instance" to "instant".

Col. 6, line 16 - change "2.30" to "2.38".

Col. 8, line 49 - change "(P)06)" to "(P-06)".

Signed and Sealed this

Sixth Day of April 1982

[SEAL]

Attest:

GERALD J. MOSSINGHOFF

Attesting Officer   Commissioner of Patents and Trademarks